(12) United States Patent
Lee

(10) Patent No.: US 6,658,576 B1
(45) Date of Patent: Dec. 2, 2003

(54) ENERGY-CONSERVING COMMUNICATION APPARATUS SELECTIVELY SWITCHING BETWEEN A MAIN PROCESSOR WITH MAIN OPERATING INSTRUCTIONS AND KEEP-ALIVE PROCESSOR WITH KEEP-ALIVE OPERATING INSTRUCTION

(75) Inventor: Howard Hong-Dough Lee, Bloomfield, MI (US)

(73) Assignee: SmartPower Corporation, Bloomfield, MI (US)

( * ) Notice: Subject to any disclaimer, the term of this patent is extended or adjusted under 35 U.S.C. 154(b) by 0 days.

(21) Appl. No.: 09/409,017

(22) Filed: Sep. 29, 1999

(51) Int. Cl.[7] .............................. G06F 1/26; G06F 1/32
(52) U.S. Cl. .............................. 713/320; 713/1; 713/2; 713/300; 713/322; 713/323; 713/324
(58) Field of Search .................................. 713/300, 320, 713/323, 324, 330, 340, 1, 2, 322

(56) References Cited

U.S. PATENT DOCUMENTS

| | | | | |
|---|---|---|---|---|
| 5,204,896 A | * | 4/1993 | Oliver | 379/106.04 |
| 5,410,713 A | | 4/1995 | White et al. | 395/750 |
| 5,465,291 A | * | 11/1995 | Barrus et al. | 379/67.1 |
| 5,491,721 A | | 2/1996 | Cornelius et al. | 375/222 |
| 5,513,361 A | | 4/1996 | Young | 395/750 |
| 5,548,711 A | * | 8/1996 | Brant et al. | 711/114 |
| 5,579,524 A | | 11/1996 | Kikinis | 395/750 |
| 5,588,054 A | | 12/1996 | Shin et al. | 379/413 |
| 5,629,654 A | | 5/1997 | Simon et al. | 341/22 |
| 5,796,580 A | * | 8/1998 | Komatsu et al. | 361/687 |
| 5,799,069 A | * | 8/1998 | Weston et al. | 379/93.33 |
| 5,802,305 A | * | 9/1998 | McKaughan et al. | 713/310 |
| 5,909,671 A | | 6/1999 | Byford et al. | 705/26 |
| 6,002,436 A | * | 12/1999 | Anderson | 348/372 |
| 6,035,408 A | * | 3/2000 | Huang | 713/320 |
| 6,118,856 A | * | 9/2000 | Paarsmarkt et al. | 379/90.01 |
| 6,134,616 A | * | 10/2000 | Beatty | 710/104 |
| 6,212,643 B1 | * | 4/2001 | Ademmer et al. | 710/10 |
| 6,240,521 B1 | * | 5/2001 | Barber et al. | 713/323 |

FOREIGN PATENT DOCUMENTS

JP          08101606 A   *   4/1996   .......... G03G/21/00

OTHER PUBLICATIONS

De, V.; Borkar, S.; "Technology and design challenges fro low power and high performance", Low Power Electronics and Design, 1999, Proceedings. 1999 International Symposium on , Aug. 16–17, 1999, Pages(s): 163–168.*

* cited by examiner

Primary Examiner—Thomas Lee
Assistant Examiner—James K. Trujillo

(57) ABSTRACT

An energy-conserving computer or information communication apparatus comprising keep-alive communication circuitry, keep-alive memory circuitry, keep-alive control means, and keep-alive operating instructions for establishing instant communications without consuming main energy. Preferably, a power source carried on a signal-transmitting phone line or cable is used as keep-alive power. Also provided is an energy-conserving operating system capable of entering an energy-conserving operating state in addition to the normal operating state and the sleep, off, or standby state. Consequently, for the first time, the energy-conserving communication apparatuses or computers can stay normally offline (like telephones) for establishing instant and universal communications therebetween via the Internet, and allow to proceed with the download of communication information in the energy-conserving operating state similar to the conventional sleep state, without entering the power-consuming normal operating state.

37 Claims, 7 Drawing Sheets

ENERGY-CONSERVING COMMUNICATION APPARATUS SELECTIVELY SWITCHING BETWEEN A MAIN PROCESSOR WITH MAIN OPERATING INSTRUCTIONS AND KEEP-ALIVE PROCESSOR WITH KEEP-ALIVE OPERATING INSTRUCTION

FIELD OF THE INVENTION

The present invention relates generally to the field of information communications and more particularly to energy-conserving information communication apparatuses (including computers) kept alive through the least amount of energy technologically possible for establishing instant communications, to an energy-conserving operating system operable between an energy-conserving and a main operating state, to in Internet service provider or Internet communication system for providing requested communications, and to the methods therefor, so as to allow the energy-conserving information communication apparatuses to stay connected via the Internet, yet without requiring to stay online as seen in the conventional practice.

BACKGROUND OF THE INVENTION

A modern computer system is mostly equipped with a modem for sending and receiving facsimile information as well as for gaining access to the Internet. Thus far, however, it cannot replace a typical fax machine because of its inconvenience in usage and inefficiency in power consumption. Inconvenience in usage is directly associated with the booting process of computer from a power-off state to an operating state, which is time consuming. In contrast, any fax machine is readily operable for receiving or transmitting facsimile information. With respect to power consumption, a conventional fax machine requires roughly 10 watts of power in order to maintain its standby state for detecting an incoming call. Much higher power consumption is expected for maintaining a conventional computer system at a corresponding standby state, in which its power supply unit (including a cooling fan), motherboard (including expansion cards), hard-disk drive, CD drive, and monitor will all incur various degrees of energy waste and will also reduce mechanical/electronic life expectancy due to mechanical rotation.

Recently, a great deal of effort has been made to conserve power usage in information-processing apparatuses, for example, U.S. Pat. Nos. 5,491,721 and 5,588,054 dealing with modems, and U.S. Pat. No. 5,410,713 dealing with computer systems. The prior arts basically improve power utilization after AC power is converted to regulated DC power through utilizing a power management processor to place a computer system selectively between a normal state and a standby state. However, improvement of a modem or a power-supply unit alone can neither enable a whole computer to operate more power-efficiently nor resolve the inconvenience mentioned hereinabove.

U.S. Pat. No. 5,579,524 suggests a power supply system utilizing a command supply (i.e., switchable) to power both a fan and peripherals, which may not be desirable in view of U.S. Pat. No. 5,513,361 describing a fan controllable to dissipate heat discharged from its host CPU (central processing unit). Similar to other prior arts, U.S. Pat. No. 5,579,524 also defines that its standby state represents the lowest power consumption mode for a computer system, equivalent to turning the computer off, and thus a user should save work in progress, close applications, and exit to the system prompt. In accordance with the conventional practice, consequently, no previous task or activity is restorable or resumable once a computer system enters the conventional standby state. To the contrary, it is highly desirable to maintain an application software program active so as to allow a computer system to be instantaneously and remotely accessible for receiving facsimile information once an incoming call is detected and so as to enable a user to instantaneously continue his/her unfinished tasks or files without reloading the software and the files. These features are attainable for a conventional computer continuously maintained at a sleep mode, but at the cost of incurring substantial energy waste as well as mechanical/electronic failure.

While U.S. Pat. No. 5,579,524 deals with supplying main power selectively to a system board as a whole, U.S. Pat. No. 5,629,694 discloses a new keyboard with a power control key and suggests that its system board is divided into three zones energized respectively by battery power, standby power, and main power. The former affords neither power conserving nor instantaneous accessibility because its system board as a whole is energized and de-energized, respectively. On the other hand, the latter defines that the elements energized selectively by main power are standard subsystem (such as RAMs, ROMs, disc drives), expansion buses, etc. Removal of the main power will save energy, but will also totally vaporize all vital information stored in the RAMs. As a result, any conventional computer needs to go through the booting procedure in order to re-find all of the necessary addresses from a hard-disk drive for reloading previously loaded software programs back to the RAMs. Because the booting procedure is timeconsuming, no conventional computer is instantaneously accessible for establishing communication once entering the conventional standby state.

Also well known is that a conventional PC power supply can only be turned on or off manually for either supplying or not supplying power. If to be idled for a prolonged period of time, a computer should be manually turned off rather than placed into a sleep mode in accordance with the conventional practice utilized in the Microsoft's window operating system that is clearly embodied in a familiar screen display "It's now safe to turn off your computer." Once turned off, however, it is simply inoperable. On the other hand, once turned on, it will continuously incur energy waste and shorten the life expectancy of a cooling fan even in the sleep mode.

It is the conventional practice from which communications between personal computers (PCs) and the Internet has thus evolved. However, the Internet allows only a PC to initiate a communication link to an Internet server for retrieving information therefrom or for transmitting e-mails therethrough, which is considered to be a passive mode of communications. Specifically, any e-mail has to send to a POP (post office protocol) server for storage and to idle therein for manual retrieval. In other words, the conventional practice does not allow anyone to be notified with the arrival of an e-mail unless he/she occurs to log onto the POP server. Likewise, even based on gateway software, the service of "instant message" offered by America Online Inc. is workable only for the PCs that are powered on and stayed online. The latter requires that a phone line be continuously occupied, which is impractical. Although communications between PCs may be achieved through a software program called Symantec PC anywhere, it is required that the conventional PCs be manually powered on for each use, which is also impractical and unacceptable as compared with the phone system. Another conventional example is U.S. Pat. No. 5,909,671 discloses a system for controlling data access in a computer network, in which a server is able to register "a virtual telephone call" from a subscriber telephone number to a service telephone number associated with the requested data stored in the server so as to bill the subscriber for his/her access at a preset charge. Because the data are stored in the server or the Internet, the virtual telephone call and utility of the prior patent are used only for establishing the charge, not for establishing communication with another client or PC. In essence, the conventional practice does not allow any power-off or even offline PCs to receive any information from the Internet, not mention to communicate directly with each other.

My allowed prior patent application (Ser. No. 09/026,032, now U.S. Pat. No. 6,089,175) discloses an energy-conserving power-supply system having keep-alive power and a control system for actuating the supply of either main DC power or AC power so as to maximize energy savings. My other patent application (Ser. No. 09/293,089, now U.S. Pat. No. 6,341,354) takes consideration of the shortcomings of the prior art mentioned hereinabove, providing a new type of line-operated or battery-operated computer for achieving not only optimized energy savings and extended battery life but instantaneous and remote accessibility, thus totally eliminating conventional, time-consuming, manual shutdown and booting processes, for the first time. The present application takes a further step to give birth to a next-generation information communication system or computer remotely reachable for establishing instant communications just like telephones. Not only will my present application allow the energy-conserving information communication apparatuses or computers to stay connected in a globe scale for establishing instant and direct communications, but it will greatly contribute to energy savings in view of their mass market.

SUMMARY OF THE INVENTION

Accordingly, a first primary preferred embodiment of the present invention is to provide an energy-conserving computer system remotely reachable for establishing instant communications, comprising (a) switchable power-supply system comprising switching means for selectively distributing switchable power; (b) a group of switchable circuits coupled to the switchable power-supply system, comprising a main microprocessor and nonvolatile memory storage; (c) keep-alive power-supply system for continuously distributing keep-alive power; (d) a group of keep-alive circuits coupled to the keep-alive power-supply system, comprising keep-alive memory means, a keep-alive communication circuit, and keep-alive control means; and (e) keep-alive operating instructions provided for allowing the keep-alive control means to request the keep-alive communication circuit to detect a communication signal in a keep-alive state in which the switchable power-supply system is deactivated for conserving energy. The keep-alive communication circuit may be adapted to comprise circuitry means for performing data conversion between digital and analog signals in the keep-alive state. Preferably, the keep-alive control means is adapted to comprise a keep-alive microprocessor for controlling the keep-alive communication circuit and the keep-alive memory circuitry to respectively receive and store any incoming information having a size smaller than a storage size available on the keep-alive memory circuitry, so as to render the energy-conserving computer reachable and operable for establishing instant communication in the keep-alive state. The keep-alive operating instructions are provided for allowing the keep-alive control means to activate the switchable power-supply system to supply the switchable power to the main microprocessor selectively (i) if in response to detection of the communication signal, no communication link is able to be established within a predetermined period of time, (ii) if the nonvolatile memory storage needs to be accessed, or (iii) if a manually-activated power-up signal is detected. The group of switchable circuit means preferably comprises selectively (i) a switchable communication circuit rendered actuatable in response to the communication signal for establishing communication with a remote communication system, (ii) volatile memory storage for loading information randomly accessible to the main microprocessor, (iii) means actuatable for dissipating heat, and/or (iv) temperature-sensitive cooling means. Preferably, the keep-alive operating instructions stored in the keep-alive memory means comprise task information readily available to the keep-alive control means for restoring a plurality of main tasks from the nonvolatile memory storage to the volatile memory storage when the switchable power-supply system is activated for providing the switchable power. The switchable power may be AC power, regulated DC power, DC power, and their combinations. On the other hand, the keep-alive DC power may be provided or generated from a power source selected from the group consisting of a signal-transmitting medium carrying keep-alive power, an external AC-power source, battery, rechargeable battery, fuel-cell means, and their combinations. Preferably, the switchable power-supply system and the keep-alive power-supply system comprise separate power sources for providing the switchable power or the keep-alive DC power, so that power is always available from one source or another. In short, the energy-conserving computer system not only is remotely accessible at any time but conserves energy to the greatest extent.

A second primary preferred embodiment of the present invention is to provide an energy-conserving communication apparatus remotely reachable for establishing instant communications, comprising (a) a switchable power-supply system comprising switching means for selectively providing switchable power; (b) a keep-alive power-supply system connectable with a signal-transmitting medium (such as a cable, optical fiber, hybrid fiber coaxial cable, CATV cable, and their combinations) that carries a keep-alive power source, for providing keep-alive power from the keep-alive power source; and (c) a group of keep-alive circuit means coupled to the keep-alive power-supply system, comprising (i) a keep-alive communication circuit coupled to the signal-transmitting medium, and (ii) keep-alive control means for controlling an activity of the switching means, so as to allow the energy-conserving communication apparatus to enter a keep-alive state in which the switchable power-supply system is deactivated while the keep-alive communication circuit remains operable for detecting a communication signal initiated from a remote communication system. The keep-alive power-supply system may further comprise an additional power source of battery for supplying backup keep-alive DC power. The switchable power may be AC power, regulated DC power, DC power, and their combinations provided or generated from a power source selected from the group consisting of an external AC-power source, battery, rechargeable battery, fuel-cell means, and their combinations. The energy-conserving communication apparatus may further comprise a group of switchable circuit means coupled to the switchable power-supply system, selectively including (i) a main microprocessor and non-volatile memory storage operable when the switchable power-supply system is activated for providing the switchable power, (ii) means actuatable in response to the communication signal for printing incoming information, (iii) means actuatable (or temperature-sensitive) for dissipating heat, and/or (iv) a switchable communication circuit coupled to the signal-transmitting medium and rendered actuatable for establishing communication in response to detection of the communication signal. Preferably, the group of keep-alive circuit means further comprises (i) keep-alive memory circuitry and (ii) keep-alive operating instructions stored in the keep-alive memory circuitry for allowing the keep-alive control means to request the keep-alive communication circuit to detect the communication signal in a keep-alive state and to actuate the switchable communication circuit for establishing communication in detection of the communication signal. Accordingly, the energy-conserving communication apparatus is rendered remotely reachable for establishing instant communication utilizing only the power source of a typical phone line, for the first time.

A third primary preferred embodiment of the present invention is to provide an energy-conserving operating system capable of selectively performing a keep-alive (or energy-conserving) operation and a main (or normal) operation. Specifically, comprised are the steps of (a) activating a set of keep-alive operating instructions continuously operable for governing when to activate a set of main operating instructions that requires more random access memory than the set of keep-alive operating instructions, so as to selectively enter an energy-conserving state and a main operating state; (b) powering down to the energy-conserving state in which the set of main operating instructions is rendered inoperable, if selectively detecting no activity for a preset period of time or detecting a power-down signal; and (c) powering up to the main operating state in which the set of main operating instructions is rendered operable, if detecting a power-up signal. Preferably, the set of keep-alive operating instructions is adapted to comprise a communication program operable in the energy-conserving state and/or the main operating state for requesting a keep-alive communication circuit to be activated for detecting a ring signal. The activating is adapted to load the set of keep-alive instructions to keep-alive random-access-memory circuitry (especially to a predetermined region or address) and wherein the powering up is adapted to restore the main operating instructions from nonvolatile memory storage to main random-access-memory circuitry (especially to another predetermined region or address) that can be powered selectively up or down. The set of keep-alive operating instructions is adapted to create keep-alive task information for restoring previous task activity when the powering up is executed, the keep-alive task information being created, updated, and saved to keep-alive random-access-memory circuitry and/or nonvolatile memory storage before the powering down is executed. Furthermore, the powering up is adapted to enter (i) a first operating state in which the set of main operating instructions will be restored via actuating nonvolatile memory storage for retrieving information therefrom to main random-access-memory circuitry, (ii) a second operating state in which information retrieval and storage will be limited to only the main random-access-memory circuitry, so as to execute the main operating instructions at full operating speed, and (iii) a third operating state in which any newly modified files will be stored from the main random-access-memory circuitry to the nonvolatile memory storage in detection of the power-down signal. Preferably, the powering down and the powering up are adapted respectively to deactivate and to activate a switchable power-supply system for not providing and for providing power main microprocessor circuitry and volatile memory circuitry utilized for execution of the main operating instructions, so as to enter the energy-conserving state and the main operating state, respectively. The powering down is further adapted to be executed after any newly modified files are stored to nonvolatile memory storage. Further comprised are (i) a step of allocating part of keep-alive random-access-memory circuitry for storing incoming information to be received in the energy-conserving state, (ii) a step of powering up to a communication state in which a switchable power-supply system is activated to provide a switchable power supply only to a switchable communication circuit and nonvolatile memory storage for respectively receiving and storing incoming information to be received, if only a ring signal is detected, and (iii) a step of allowing a user to request a forwarding or routing service.

A fourth primary preferred embodiment of the present invention is to provide an Internet communication system comprising (a) communication means connected to the Internet and rendered operable for sending a ring signal and thus for initiating an outgoing communication link to an offline communication device; (b) a control system for controlling operation of the communication means; and (c) operating instructions available to the control system for requesting the communication means to send the ring signal in accordance with a request submitted through an incoming communication link from a remote communication device, so as to allow the Internet communication system to provide requested communication from the remote communication device to the offline remote communication device via the Internet. Herein the offline remote communication device may be a server computer, a desktop computer, a portable computer, a notebook computer, a wireless phones, or a cellular phone each comprising a respective communication circuit that stays normally in an offline state capable of receiving an incoming ring signal. Preferably, the communication means comprises a communication-link means such as a telephone line, cable, optical fiber, hybrid fiber coax, cellular phone channel, satellite communication channel, wireless communication channel, and their combinations, for initiating a plurality of the outgoing communication links. The communication means is further adapted to comprise a plurality of local communication circuitry connected to the Internet at separate locations, each of the local communication circuitry being rendered operable for initiating a plurality of the outgoing communication links and for establishing another plurality of the incoming communication links. The operation instructions are adapted to selectively comprise (i) a step of selecting one of the local communication circuitry that is situated at a location with an area code in accordance with the request to send the ring signal to the offline remote communication device, or (ii) a step of automatically terminating the outgoing communication link selectively if the remote communication device terminates the incoming or the outgoing communication link, or if the Internet communication system completes the sending of requested information to the offline remote communication device and detects no activity on the outgoing communication link for a preset period of time. The Internet communication system may further comprise memory storage for storing information to be transmitted between the remote communication device and the offline remote communication device. The operating instructions are provided for requesting the communication means to send a message to the offline remote communication device through the outgoing communication link to instantly notify the delivering of the information.

A fifth primary preferred embodiment of the present invention is to provide a method for enabling an Internet service provider to provide requested communications, comprising the steps of (a) providing communication means operable (i) for establishing an incoming communication link to the Internet when receiving an incoming ring signal from a remote communication device and (ii) for initiating an outgoing communication link through sending an outgoing ring signal to an offline remote communication device; (b) providing a control system for controlling operation of the communication means; and (c) providing operating instructions rendered available to the control system for instructing the communication means to send the outgoing ring signal and thus to initiate the outgoing communication link in accordance with a request submitted from the remote communication device, so as to allow the remote communication device to communicate with the offline remote communication device via the Internet. The step of providing communication means is adapted to provide a plurality of local communication circuitry connected to the Internet at separate locations, each of the local communication circuitry being further rendered operable for establishing a plurality of the incoming communication links and for initiating another plurality of the outgoing communication links. The step of providing operation instructions is adapted to provide a step of selecting one of the local communication circuitry that is situated at a location with an area code in accordance with the request to send the outgoing ring signal to the offline remote communication device, at the rate of a local call or a reduced rate. The method may further comprise a step of providing a forwarding or routing service.

A sixth primary preferred embodiment of the present invention is to provide a communication operating system for enabling an Internet communication system to provide requested communication links, the communication operating system comprising the steps of (a) allowing the Internet communication system to establish a plurality of incoming communication links each to be initiated by a remote communication apparatus to access the Internet; (b) determining if the remote communication apparatuses each submits a request for communicating further with an offline communication apparatus; and (c) if yes, instructing the Internet communication system to send an outgoing ring signal to a respective one of the offline communication apparatuses accordingly so as to establish another plurality of outgoing communication links. The communication operating system may further afford a forwarding or routing service.

DETAILED DESCRIPTION OF THE PREFERRED EMBODIMENT

Figure 1:
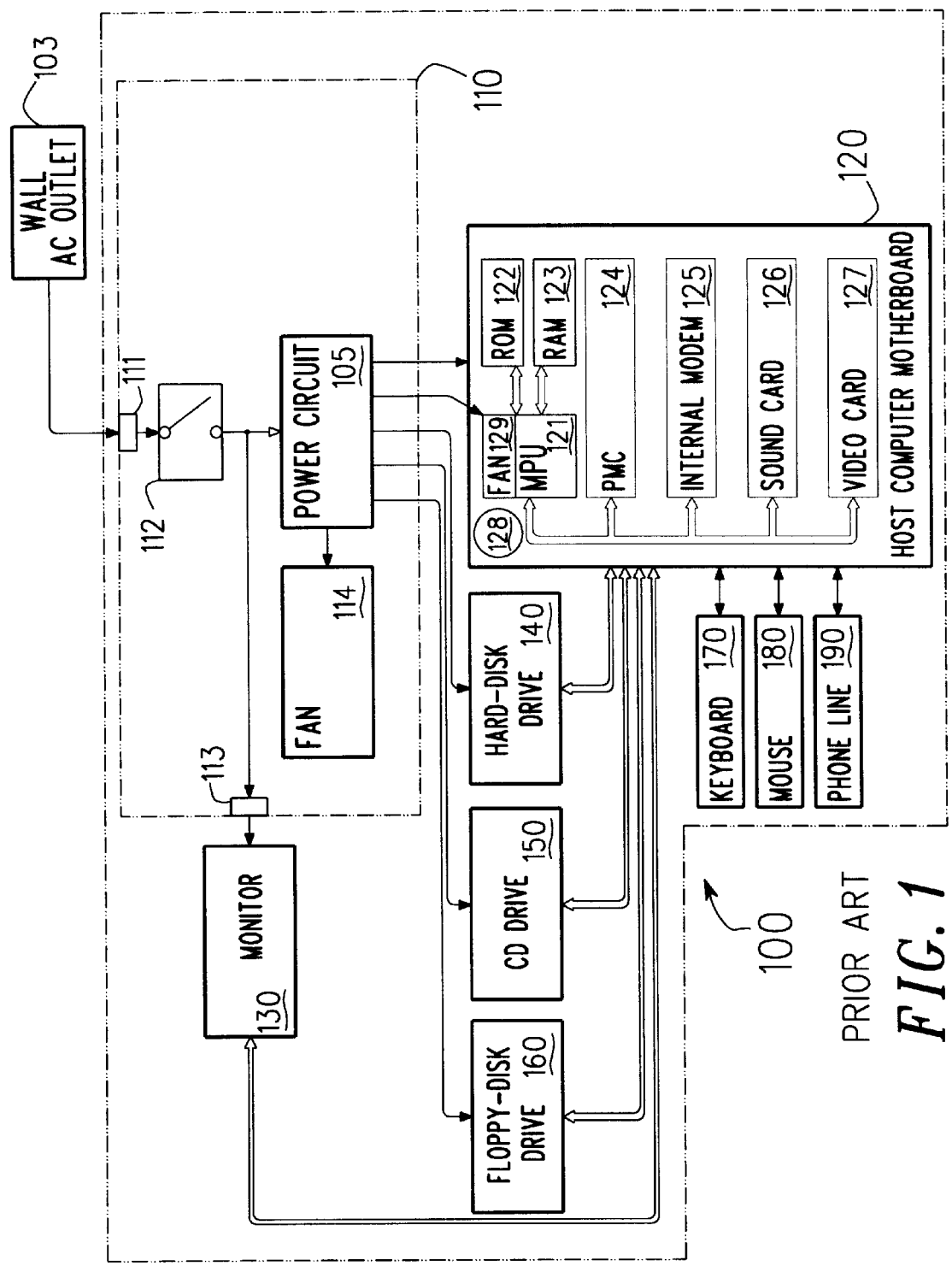
FIG. 1 is a block diagram of a conventional computer.

In conventional practice, FIG. 1, a line-operated power-supply unit 110 utilized in a computer system 100 basically contains an AC-power receptacle 111, a manual power switch 112 for manually inputting AC power (either 115 or 220 VAC) from a wall AC outlet (i.e., an external AC source) 103, an AC outlet 113 for outputting 115 VAC to power a monitor 130 at the same time, a cooling fan 114, and a power circuit 105. Power circuit 105 has several DC-power outputs (including ±12 VDC, ±5 VDC, powergood, and ground lines) for supplying regulated DC power to a host computer motherboard 120, a hard-disk drive 140, a CD drive 150, and a floppy-disk drive 160. In circuit communication with motherboard 120, each of the last three drives receives +12 VDC and +5 VDC directly from power circuit 105. Motherboard 120 is mounted with a microprocessor (MPU) 121, read only memory (ROM) 122, random-access memory (RAM) 123, a power management circuit (PMC) 124, an internal modem 125, a sound card 126, a video card 127, and a battery 128. A fan 129 mounted on MPU 121 always keeps rotating in order to remove heat dissipated from MPU 121. Motherboard 120 is also in circuit communication with a keyboard 170, a mouse 180, and a phone line 190. PMC 124 renders computer system 100 operable in several states including an off, standby, or suspended state for conserving power.

In accordance with the conventional practice, substantial energy waste is inevitable even if computer system 100 is placed in its standby state. First, power-supply unit 110 has to continuously supply regulated DC power to the entire circuitry of motherboard 120, including the whole entity of MPU 121, all memory modules (RAM and ROM), all expansion slots and respective expansion cards or boards 124–127. Second, the cooling fan for dissipating heat generated by the power-supply unit is designed to rotate continuously, once computer system 100 is turned on, thus incurring energy waste even in the standby or off state. Third, regulated DC power is continuously supplied to peripheral drives including hard-disk drive 140, CD drive 150, and floppy-disk drive 160. Fourth, AC power output to an external line-operated device (for example, monitor 130) is not signal actuatable; thus, energy waste is inevitable not only within but outside the computer system, once AC power is turned on. On the other hand, once entering the conventional power-off state, computer system 100 receives no power and all information previously stored in RAM will be lost totally. Consequently, no previous task is restorable or resumable, even if computer system 100 can be remotely actuated.

Accordingly, a first primary preferred embodiments of the present invention are to provide an energy-conserving computer remotely reachable for establishing instant and direct communications.

Figure 2:
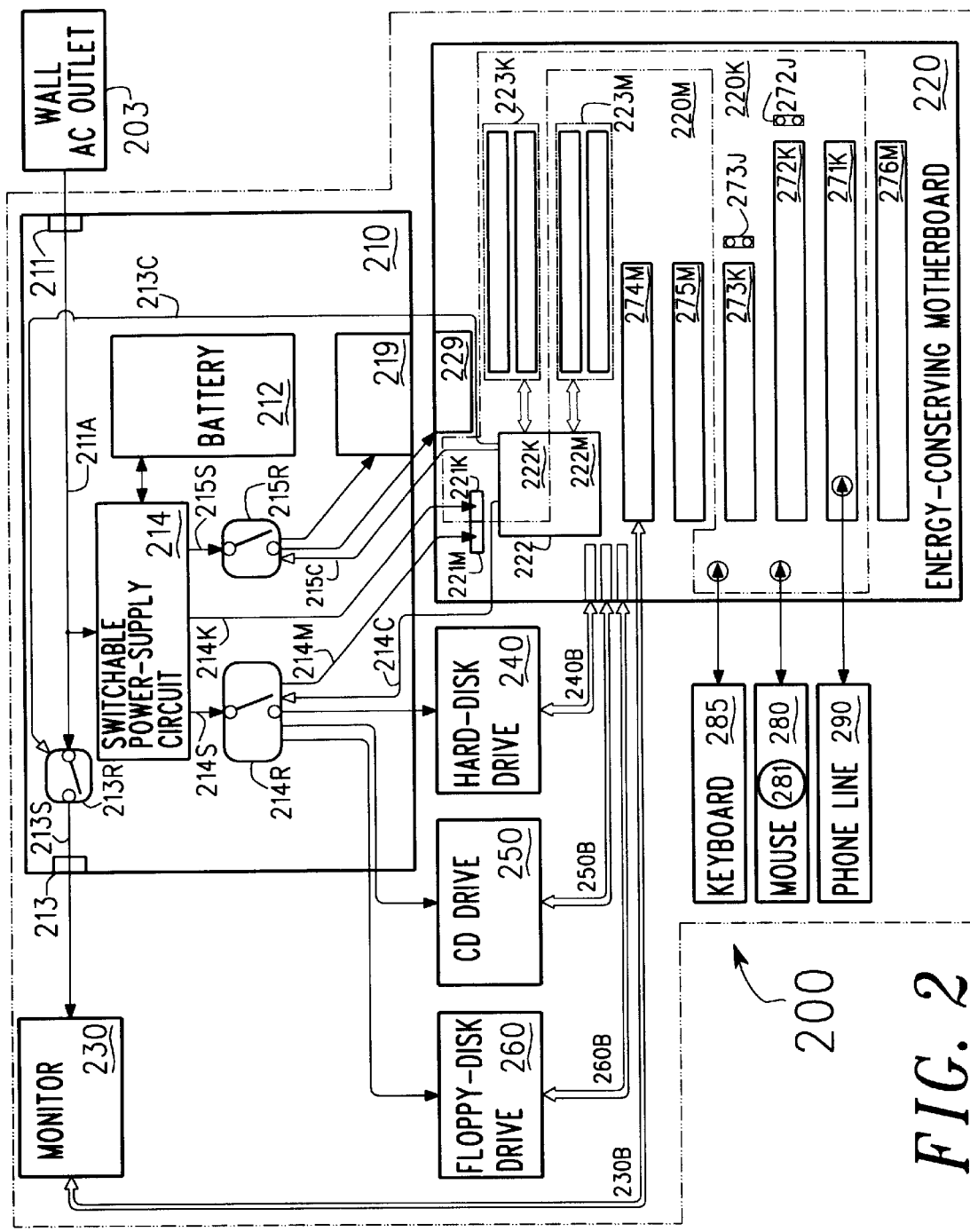
FIG. 2 is a block diagram of an energy-conserving computer remotely accessible for establishing instant and direct communications, in accordance with a first primary preferred embodiment of the present invention.

Referring now to FIG. 2, illustrated is a block diagram of an energy-conserving computer 200 basically comprising an energy-conserving power-supply system 210 and an energy-conserving motherboard 220. Comprised in energy-conserving power-supply system 210 are an AC-power receptacle 211 for receiving AC power from a wall AC outlet 203 (i.e., an external AC source) and for supplying an AC-power supply 211A, a relay 213R for distributing a switchable AC power supply 213S to an AC outlet 213, a rechargeable battery 212, and a switchable power-supply circuit 214 for providing regulated DC power (converted from AC power) to relays 214R and 215R and for supplying a keep-alive power supply 214K to a keep-alive power connector 221K. Relays 213R, 214R and 215R are signal controllable respectively through interface lines 213C, 214C and 215C that are in circuit communication with keep-alive MP circuitry 222K of a microprocessor (or CPU) 222, thus capable of receiving a control signal in a keep-alive state for actuating the distribution of switchable AC power supply 213S, switchable DC-power supplies 214S and 215S. Switchable DC-power supply 214S is further distributed to a plurality of outlets including a power line 214M for supplying main DC power with various voltage outputs to a main power connector 221M stationarily disposed on energy-conserving motherboard 220, and power lines for energizing secondary storage including a hard-disk drive 240, a CD drive 250, and a floppy-disk drive 260. On the other hand, relay 215R is provided for selectively distributing switchable DC power 215S to cooling fans 219 and 229 (respectively enclosed in energy-conserving power-supply system 210 and disposed on microprocessor 222). Preferably, relay 215R is a thermostat (i.e., a temperature-sensitive switch) arranged in such a manner as to be actuated at the time when detecting that the temperature inside energy-conserving computer 200 or preferably microprocessor 222 exceeds a preset value. In any events, these additional relays allow the activities of cooling fans 219 and 229 to be controlled separately from host and peripheral devices including energy-conserving motherboard 220, hard-disk drive 240, CD drive 250, floppy-disk drive 260, a keyboard 285, and a mouse 280.

In brief, energy-conserving power-supply system 210 is rendered to comprise keep-alive power-supply circuitry for continuously supplying low-amperage DC power (e.g., 500 mA or less) and switchable power-supply circuitry for selectively supplying high-amperage DC power (typically, from 1 to 24 A) only when needed.

Comprised in energy-conserving motherboard 220 are keep-alive power-supply circuitry 220K and switchable power-supply circuitry 220M, which is totally different from motherboard 120 in a conventional type from the view point of power distributing and characteristics. More specifically, energy-conserving motherboard 220 is afforded with keep-alive power connector 221K for receiving keep-alive power supply 214K and with main power connector 221M for receiving main DC power through power line 214M, so as to limit keep-alive power consumption within the region defined by keep-alive power-supply circuitry 220K. Further comprised in energy-conserving motherboard 220 are microprocessor 222 having keep-alive MP circuitry 222K and main MP circuitry 222M, keep-alive memory modules 223K and main memory modules 223M, keep-alive expansion slots 271K–273K and switchable expansion slots 274M–276M, and jumpers 272J and 273J. Preferably, keep-alive MP circuitry 222K servers as a center controller for controlling an activity of relays 213R–215R in the keep-alive state. Keep-alive memory modules 223K and main memory modules 223M may be rewritable random access memory (i.e., primary memory) that is fast in speed but volatile in nature. However, because of being continuously powered, keep-alive memory modules 223K become non-volatile in effect. Preferably, keep-alive memory modules 223K are SRAM (static random-access memory) chips or modules and/or a combination of SRAM and ROM modules. Use of the SRAM modules eliminates the need to refresh the contents of information stored therein many times a second; thus, the task information needed to be kept alive can be retained through power of a small battery during the keep-alive state. Use of ROM chips or modules allows some preset basic operating instructions (such as a flowchart to be discussed in FIG. 3) to be resident without loading software each time. Jumpers 272J and 273J each with two pins respectively render expansion slots 272K and 273K selectively alive (currently) and inactive (when opened) in the keep-alive state, allowing the keep-alive and switchable power-supply circuitry to be manually reconfigured at need.

Expansion slots are input/output (I/O) connectors in effect. Modem and network cards can be detachably established circuit connection with ISA-bus-type expansion slots 271K and 272K, so as to be kept alive for receiving facsimile information and for being interfaced by a LAN (local area network). Another ISA-bus-type slot 276M can be used to detachably establish circuit connection with a 16-bit sound card. Expansion slot 274M is of a PCI-bus type suitable for detachably establishing circuit connection with a 32-bit PCI video card that is in circuit connection further with a monitor 230 through a bus 230B. Thus, neither sound card 276M, video card 274M nor empty bus slots is powered, thus totally eliminating any power waste inevitably incurred by a conventional computer placed in the conventional standby state.

Bus connectors are also I/O connectors in nature. FIG. 2 shows that peripheral drives including hard-disk drive 240, CD drive 250, and floppy-disk drive 260 are connected respectively through buses 240B, 250B, and 260B to bus connectors that are part of switchable power-supply circuitry 220M. On the other hand, a phone line 290 is coupled to a modem card 281 disposed on slot 271K that is part of keep-alive power-supply circuitry 220K. Also part of keep-alive power-supply circuitry 220K are connectors currently connected by keyboard 285 and mouse 280.

All of the elements or circuitry disposed on energy-conserving motherboard 220 can be categorized into two groups, i.e., a group of keep-alive circuitry with reference numerals ended with "K" (including keep-alive power connector 221K, keep-alive MP circuitry 222K, keep-alive memory modules 223K, and keep-alive expansion slots 271K–273K) and a group of switchable circuitry with reference numerals ended with "M" (including main power connector 221M, main MP circuitry 222M, and switchable expansion slots 274M–276M). The group of keep-alive circuitry includes not only keep-alive memory modules 223K but a CMOS clock circuit (not shown) that is required for continuously providing a current time and date, while the group of switchable circuitry is selectively energized by switchable power-supply circuitry 220M only when needed. To facilitate installation, the connectors or slots comprised in the keep-alive power-supply circuitry (especially keep-alive power connector 221K, and slots 223K and 271K–273K) may be adapted into a green color, while the switchable power-supply circuitry (especially main power connector 221M, slots 223M and 274M–276M) are in red. Another alternative is to respectively label the power connectors and slots, so as to render the keep-alive and the switchable connectors (or slots) visually distinguishable from each other for the purpose of detachably establishing circuit communication with corresponding keep-alive and switchable circuit cards (including memory modules) properly.

Preferably, either keep-alive memory modules 223K or nonvolatile memory storage such as hard-disk drive 240 is adapted to comprise an area predefined specifically for storing incoming information. Any transferring of the incoming information requires going through a step of virus detection, so as to prevent spreading of virus, if any, to other areas of the nonvolatile memory storage.

In brief, energy-conserving motherboard 220 comprises (a) keep-alive power-supply circuitry 220K for continuously distributing low-amperage keep-alive DC power to at least one connector (or bus slot) each for detachably establishing circuit communication with a circuit board (or a memory module) to be kept alive, (b) a first group of circuitry in power connection with the keep-alive power-supply circuitry, wherein the first group of circuitry includes keep-alive memory (preferably, SRAM) for storing task information to be retained and preferably keep-alive MP circuitry, (c) switchable power-supply circuitry 220M comprising switching means for selectively supplying high-amperage regulated main DC power (converted from AC power), only when needed, to a plurality of connectors for detachably establishing circuit communication with circuit cards to be selectively powered by the main DC power, and (d) a second group of circuitry in power connection with the switchable power-supply circuitry, wherein the second group of circuitry includes volatile memory and main MP circuitry that are known to become increasingly power hungry. Accordingly, energy-conserving computer 200 becomes remotely accessible through a modem and instantaneously restorable to resume previous activity, through use of the very least amount of power technologically possible.

Keep-alive MP circuitry 222K renders energy-conserving computer 200 controllable from the keep-alive state without requiring additional hardware such as a power management circuit board utilized in conventional practice. The keep-alive state of the present invention possesses all functions available to a conventional operating state, yet consumes power not much different from a conventional power-off state. In contrast, a conventional computer in the power-off state is totally inaccessible unless being manually powered up and going through a time-consuming booting process.

Keep-alive memory modules 223K are provided for retaining task information that renders energy-conserving computer 200 instantaneously restorable especially to resume previous activity if detecting a signal from mouse 280 or keyboard 285. In contrast, the conventional computer cannot retain its previous activity once entering the power-off state and inevitably requires a time-consuming booting process that is not practical for facsimile and telephone-answering applications.

Figure 3:
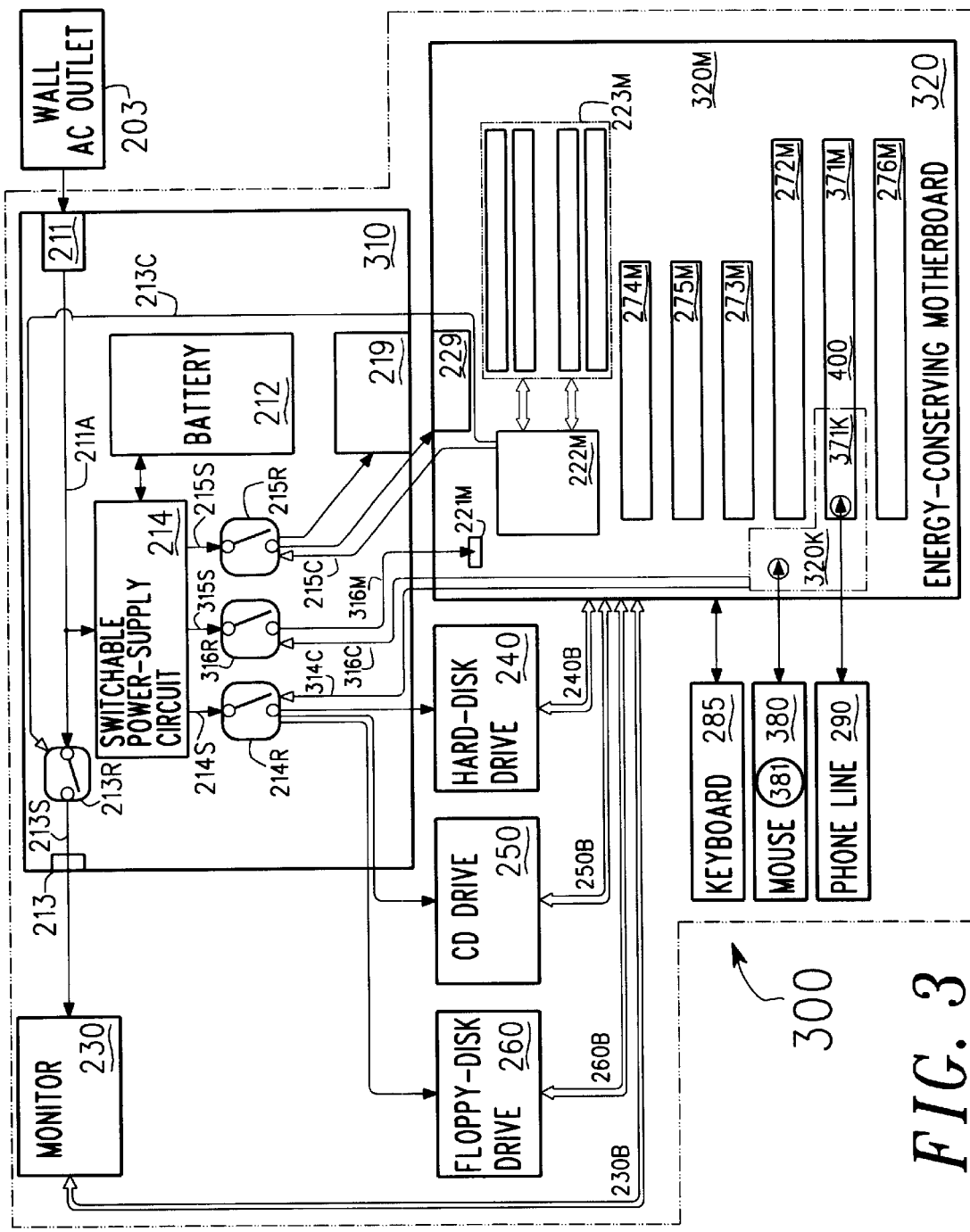
FIG. 3 is a block diagram of an energy-conserving computer system comprising an energy-conserving communication apparatus in accordance with a second primary preferred embodiment of the present invention.

Referring now to FIG. 3, illustrated is a second primary preferred embodiment of the present invention, showing an energy-conserving computer 300 comprising basically an energy-conserving communication 400 (to be detailed in FIG. 4) disposed on an energy-conserving motherboard 320 coupled to an energy-conserving power-supply system 310. Energy-conserving power-supply system 310 has various components nearly identical to energy-conserving power-supply system 210 displayed in FIG. 2, except for an additional relay 316R for providing a switchable power supply 316S to a main power connector 321M. Relays 214R and 316R are controlled by a keep-alive control circuit 430 (to be shown in FIG. 4) through interface lines 314C and 316C. Furthermore, energy-conserving motherboard 320 has a much limited region of keep-alive power-supply circuitry 320K for distributing keep-alive power to a manual-operable button 381 on a mouse 380 and a hybrid expansion slot 371 (having keep-alive and switchable portions 371K and 371M) for accommodating energy-conserving communication apparatus 400.

The supply of separate switchable power supplies to main memory modules 223M (i.e., volatile memory storage) and main MP circuitry 322M and to hard-disk drive 240 (i.e., nonvolatile memory storage), and rechargeable battery 212 is arranged to provide backup DC power to switchable power-supply circuitry 214 when the AC power is suddenly absent, so as to allow energy-conserving computer 300 to "safely" gain full operating speed via performing information retrieval and storage only on the volatile memory storage. In contrast, operation of a conventional computer requires that the process of information retrieval and storage be frequently associated with a hard-disk drive, a very sluggish operation. The sluggishness becomes even more severe when the sleep mode of the conventional practice turns off and on the rotation of the hard-disk drive frequently.

Figure 4:
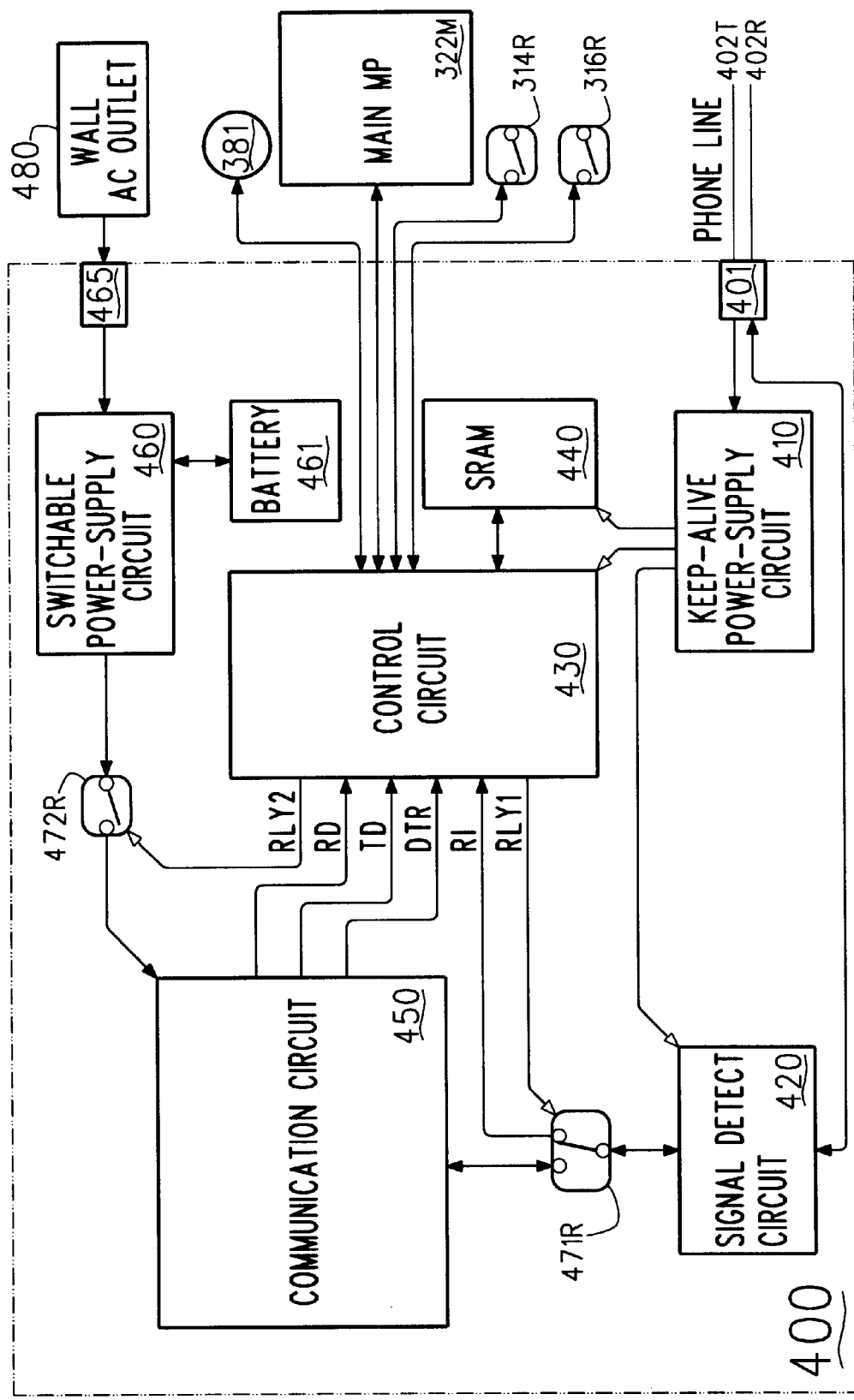
FIG. 4 is a block diagram of an energy-conserving communication device kept alive through the power carried by a phone line in accordance with the second primary preferred embodiment of the present invention.

Referring now to FIG. 4, further illustrated is the second primary preferred embodiment of the present invention in which energy-conserving communication apparatus 400 and/or energy-conserving computer 300 will be kept alive through the keep-alive power carried on a signal-transmitting medium, i.e., phone line 290 specifically in this preferred embodiment. Other signal-transmitting media suitable for the purpose of carrying communication signals and power may include a cable, coaxial cable, optical fiber, hybrid fiber coaxial cable, CATV cable, and their combinations.

Energy-conserving communication apparatus 400 is rendered to comprise a phone modular socket 401 for removably accommodating a phone modular jack with the signal-transmitting medium of phone line including a tip line 402T and a ring line 402R that are powered at 48 V DC from storage batteries for communication circuitry and at 90 to 145 V AC (at 20, 30, 40, or 50 kHz superimposed upon the DC operating current) from local AC generators for ring circuitry. A keep-alive power-supply circuit 410 is afforded for regulating the power carried on the phone line so as to output keep-alive DC power to a ring detect circuit (or keep-alive communication circuit) 420, a control circuit 430, and SRAM 440. Ring detect circuit 420 in circuit connection with the phone line is adapted to detect a ring signal carried by 90 to 145 V AC. Coupled to ring detect circuit 420 is a relay 471R that is normally at a first position for readily alerting control circuit 430 through an RI (ring indicator) pin if there is an incoming call. Upon detection of an incoming call from a remote communication system, control circuit 430 not only switches relay 471R into a second position for establishing connection with a communication circuit 450 but actuates a relay 472R for supplying main DC power from a switchable power-supply circuit 460 to communication circuit 450. Control circuit 430 further monitors the activities of communication circuit 450 through a DTR (data terminal ready) pin, a RD (received data) pin, and a TD (transmitted data) pin, so as to switch off relays 471R and 472R when detecting no activity. Preferably, switchable power-supply circuit 460 receiving AC power from an AC-power receptacle 465 connected to a wall AC outlet 480 is coupled to a rechargeable battery 461, so as to supply main DC power from rechargeable battery 461 in the sudden absence of the AC power. In addition to AC and battery power, switchable power-supply circuit 460 may supply and generate switchable power from other power sources such as fuel cells. Switchable power-supply circuit 460 ensures that output communication signals conform to the FCC Part 68 rules.

With additional mechanisms for printing, energy-conserving communication apparatus 400 can be a new type of fax machine that consumes neither battery nor AC power completely in its keep-alive state. Switchable power-supply circuit 460 may include another relay adapted to be temperature sensitive for supplying a switchable power supply to actuate a cooling fan to dissipate heat only when the temperature inside the energy-conserving communication apparatus exceeds a preset value.

Switchable power-supply circuit 460, rechargeable battery 461, and AC-power receptacle 465 shown in FIG. 4 may be disposed exteriorly as replaced respectively by switchable power-supply circuit 214, rechargeable battery 212, and AC-power receptacle 211 shown in FIG. 3, so that energy-conserving communication apparatus 400 is an expansion card to be plugged into hybrid expansion slot 371 on energy-conserving motherboard 320 (FIG. 3). The integration of FIGS. 3 and 4 makes energy-conserving communication apparatus 400 itself an energy-conserving computer readily for establishing communication and for storing incoming information to SRAM 440 or hard-disk drive 240 (i.e., nonvolatile memory storage).

For use in digital applications, communication circuit 450 is adapted to comprise a modem chip (or an analog-to-digital converter and a digital-to-analog converter respectively) for demodulating and modulating data. SRAM 440 serving as keep-alive memory circuitry is provided for storing operating instructions, incoming information, and/or task information associated with energy-conserving computer 300. Preferably, the operating instructions are adapted to comprise a step of requesting energy-conserving communication apparatus 400 be readily prepared so as to actuate communication circuit 450 for receiving incoming information when ring detect circuit 420 detects a ring (or communication) signal.

Also preferred is a manually-operable input means such as manual-operable button 381 on mouse 380 (shown in FIG. 3) for manually requesting energy-conserving communication apparatus 400 and/or energy-conserving computer 300 to instantly enter a first, a second, a third, and a fourth state. In the first state, the step of requesting is actuated so as to switch relays 471R and 472R off and to allow ring detect circuit 420 to be effective for detecting an incoming call. In the second state, manual-operable button 381 requests control circuit 430 to actuate switchable power-supply circuit 460 for providing main power to interface with main MP 322M (seen also in FIG. 3) for resuming its previous activity (through restoring main tasks from nonvolatile memory storage to main RAM memory) in accordance with the task information stored in SRAM 440. After the main tasks are loaded, the third state become effective in which information retrieval and storage will be performed only on the main RAM circuitry (via turning relay 316R on, but relay 214R off) so as to gain full operating speed. In the fourth state, manual-operable button 381 switches relay 471R on so as to render energy-conserving communication apparatus 400 instantly ready for dialing out.

The operating instructions comprise the steps of (i) determining if incoming information received from a remote communication system (such as a computer or phone) requests any data-forwarding or routing service, (ii) if yes, selectively instructing communication circuit 450 or requesting the remote communication system to further initiate another communication link to another remote communication system in accordance with a forwarding or routing instruction stored in SRAM 440, and (iii) transmitting requested information or at least a message to the another remote communication system (such as another computer, pager, portable or mobile communication device). When carrying the another remote communication system, a person becomes instantly reachable for receiving any urgent electronic mails.

The operating instructions are further adapted to comprise the steps of (i) requesting communication circuit 450 to be actuated for receiving incoming information in response to a communication signal (or ring), (ii) storing the incoming information to another volatile memory means, (iii) checking if the incoming information contains any virus, and (iv) if not, storing the incoming information to SRAM 440 or hard-disk drive 240.

For the first time, energy-conserving communication apparatus 400 can keep energy-conserving computer 300 alive and ready for establishing instant and direct communications through the power carried on the phone line 420T and 420R, thus totally eliminating any energy (such as battery and AC power) waste.

Figure 5:
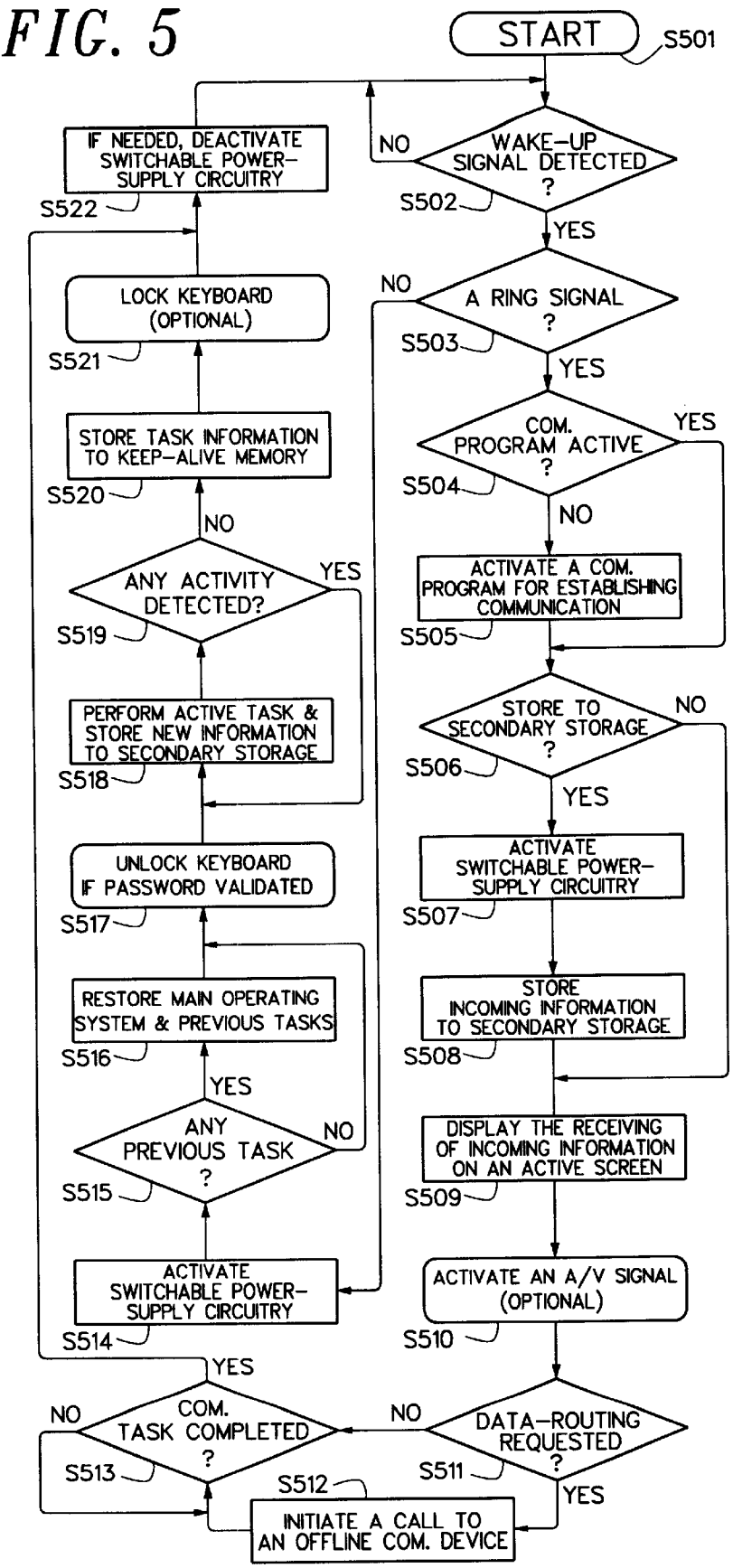
FIG. 5 is a flowchart showing an energy-conserving operating system operable selectively between a keep-live and a main operating state, in accordance with a third primary preferred embodiment of the present invention.

Referring now to FIG. 5, disclosed is a third primary preferred embodiment of the present invention that is an energy-conserving operating system for rendering an energy-conserving communication apparatus 400 (or computer 300) capable of selectively entering a keep-alive (i.e., energy-conserving) state in which only limited operating instructions preferably including a communication program need to be resident on keep-alive RAM circuitry, and a normal (i.e., main operating) state in which operating instructions are fully loaded to main RAM circuitry for execution. Note that "S" stands for "Step" hereinafter and the energy-conserving operating system will be discussed in conjunction with FIG. 4. Comprised in the energy-conserving operating system is a set of keep-alive instructions that can be hardwired to a ROM chip (i.e., nonvolatile but non-changeable) or loaded to SRAM 440 through software installation so as to be resident on the keep-alive memory circuitry and readily executable by control circuit 430, once the energy-conserving communication apparatus 400 is activated at the first time (S501). When a wake-up signal (S502) is detected, control circuit 430 further determines if it is a ring signal (S503) and if a communication program is active (S504). If it is a ring signal but no active communication program is available, a communication program will be activated (S505) for establishing communication. If SRAM 440 has enough storage for keeping the communication program resident, S504 and S505 can be eliminated. In case that SRAM 440 does not have enough storage, switchable power-supply circuitry will be activated for allowing nonvolatile or secondary storage (such as a hard-disk drive) to store incoming information (S506–S508). Otherwise, the incoming information will be preferably stored to SRAM 440 and the energy-conserving operating system enters S509 for displaying the receiving of the incoming information on an active screen. An optional step (S510) is to activate an audio or video signal for alerting a user the receiving of the incoming information. In case that the user is away from energy-conserving communication apparatus 400 and is reachable through an offline communication device, a data routing service can be requested (S511). Then, a call to the offline communication device will be initiated (S512). If the communication task is completed (S513), switchable power-supply circuit 460 is deactivated when needed (S522).

Should the wake-up signal be a power-up (including manually-activated) signal, the energy-conserving operating system is routed to S514 in which switchable power-supply circuit 460 is activated. Then, task information stored in keep-alive memory will allow a main operating system and previous tasks to be quickly restored (S515 and S516) from nonvolatile memory storage to main RAM circuitry, without going through the conventional tedious boot process. Optionally shown in S517 is to validate logging password before granting a user an access to the energy-conserving communication apparatus 400. The user can also manually perform any task and store new information to secondary memory storage (S518). If no activity is detected in a predetermined period of time (S519), the task information will be updated and stored to keep-alive memory (S520) and a keyboard device is optionally locked (S521). Finally, switchable power-supply circuit 460 is deactivated, thus routing the process back to S502 for staying in the keep-alive state of the present invention. Thus, the present invention not only totally eliminates the conventional, time-consuming, manual shutdown/booting processes but renders energy-conserving communication apparatus 400 remotely accessible for establishing instant and direct communications for the first time.

In summary, the third primary preferred embodiment of the present invention discloses an energy-conserving operating system capable of selectively performing a keep-alive (or energy-conserving) operation and a main (or normal) operation. Specifically, comprised are the steps of (a) activating a set of keep-alive operating instructions continuously operable for governing when to activate a set of main operating instructions that requires more random access memory than the set of keep-alive operating instructions, so as to selectively enter an energy-conserving state and a main operating state; (b) powering down to the energy-conserving state in which the set of main operating instructions is rendered inoperable, if selectively detecting no activity for a preset period of time or detecting a power-down signal; and (c) powering up to the main operating state in which the set of main operating instructions is rendered operable, if detecting a power-up signal. Preferably, the set of keep-alive operating instructions is adapted to comprise a communication program operable in the energy-conserving state and/or the main operating state for requesting a keep-alive communication circuit to be activated for detecting a ring signal. The activating is adapted to load the set of keep-alive instructions to keep-alive random-access-memory circuitry (especially to a predetermined region or address) and wherein the powering up is adapted to restore the main operating instructions from nonvolatile memory storage to main random-access-memory circuitry (especially to another predetermined region or address) that can be powered selectively up or down. The set of keep-alive operating instructions is adapted to create keep-alive task information for restoring previous task activity when the powering up is executed, the keep-alive task information being created, updated, and saved to keep-alive random-access-memory circuitry and/or nonvolatile memory storage before the powering down is executed. Furthermore, the activating is adapted to load the set of keep-alive instructions to keep-alive random-access-memory circuitry and the powering up is adapted to enter (i) a first operating state in which the set of main operating instructions will be restored via actuating nonvolatile memory storage for retrieving information therefrom to main random-access-memory circuitry, (ii) a second operating state in which information retrieval and storage will be limited to only the main random-access-memory circuitry, so as to execute the main operating instructions at full operating speed, and (iii) a third operating state in which any newly modified files will be stored from the main random-access-memory circuitry to the nonvolatile memory storage in detection of the power-down signal. Preferably, the powering down and the powering up are adapted respectively to deactivate and to activate a switchable power-supply system for not providing and for providing power to a plurality of circuit means including main microprocessor circuitry and volatile memory circuitry utilized for execution of the main operating instructions, so as to enter the energy-conserving state and the main operating state, respectively. The powering down is further adapted to be executed after any newly modified files are stored to nonvolatile memory storage. Further comprised are (i) a step of allocating part of keep-alive random-access-memory circuitry for storing incoming information to be received in the energy-conserving state, (ii) a step of powering up to a communication state in which a switchable power-supply system is activated to provide a switchable power supply only to a switchable communication circuit and nonvolatile memory storage for respectively receiving and storing incoming information to be received, if only a ring signal is detected, and (iii) a step of allowing a user to request a forwarding or routing service.

By offering the keep-alive state, the third primary preferred embodiment of the present invention eliminates any need for larger RAM circuitry and powerful MP circuitry for use in the keep-alive state, i.e., eliminating unnecessary energy waste on unwanted generation of heat. Consequently, neither heat dissipation, mechanical failure (possibly incurred by the continuous rotation of a cooling fan), nor unpleasant noise will be of any concern.

Figure 6:
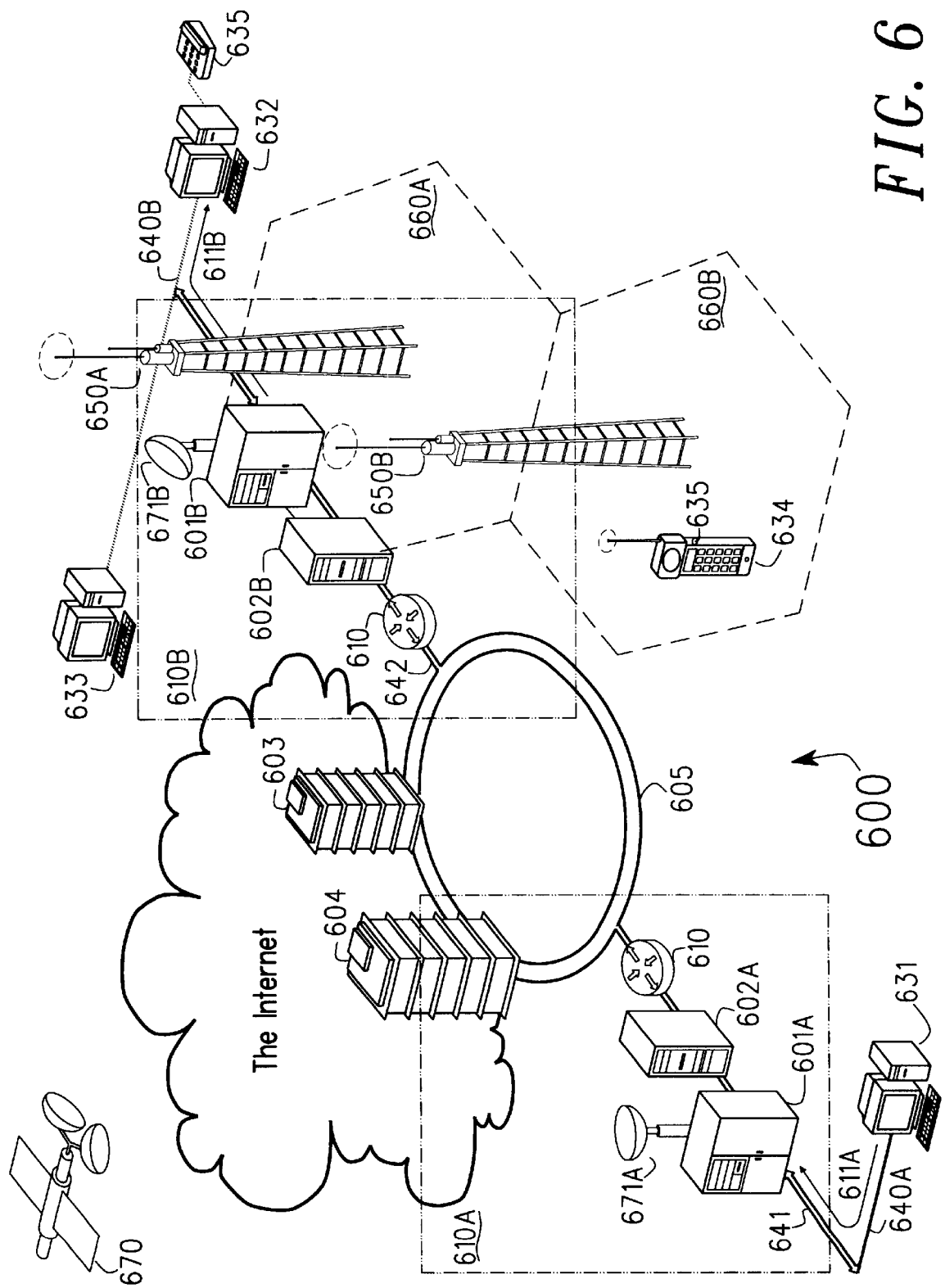
FIG 6 is a simplified diagram of an Internet service provider rendered operable for initiating an outgoing communication link to an offline remote communication device in accordance with fourth and fifth primary prod embodiments of the present invention.

Referring now to FIG. 6, a fourth primary preferred embodiment of the present invention is an ISP (Internet service provider) 600 for providing requested communication links initiated from a remote computer (or communication device) 631 to an offline remote computer (or communication device) 632 or 633 via the Internet. The Internet is based on a TCP (transmission control protocol) and IP (Internet protocol) family of protocols that govern how online computers communicate with each other. A conventional ISP only allows a PC to initiate communication with the Internet for retrieving information therefrom or for transmitting e-mails therethrough. This is a passive communication because the conventional ISP cannot reach any conventional PC that is neither powered on nor kept online continuously. Furthermore, a conventional PC is designed to be shut down and offline if not to be used for a prolonged period of time. Once shut down or offline, neither the conventional PCs nor notebook computers is operable or accessible from remote. For these reasons, none of the conventional ISPs has suggested to provide an "impractical" service of sending a ring signal for establishing communication to a conventional offline PC.

With the advent of an energy-conserving computer (or communication apparatus) disclosed hereinabove, for the first time, the present invention provides a motive to demand an Internet service provider (ISP) be able to dial out or to send a ring signal for establishing a requested communication link. Thus, the third primary preferred embodiment of the present invention is to provide a new type of ISP capable of initiating requested communication links to any energy-conserving communication apparatuses or computers of the present invention can be reached (for receiving incoming information or for retrieving data stored therein) at any time through the Internet without stays online. In contrast, any conventional PC has to keep online, i.e., occupying a phone all the time and incurring substantial energy waste, in order to be reachable.
provided is an energy-conserving computer or communication that can be kept alive and readily accessible from remote for establishing communication. Consequently.

As shown in FIG. 6, ISP 600 has Internet communication systems 610A and 610B each basically comprising an Internet communication unit 601A or 601B connected an ISP backbone 605 (with a speed up to 45 Mbs) at a separate location. ISP backbone 605 has connectivity with an Internet backbone carrier site often at an MAE (Metropolitan Area Exchange) 603 that further connects the Internet at a NAP (Network Access Point) 604 currently with a bandwidth of 45–622 Mbs.

Comprised in Internet communication units 601 are Internet communication circuitry, a control system, and operating instructions. The Internet communication circuitry is adapted to be operable (i) for establishing a first communication link selectively initiated by a remote communication device (or computer), and (ii) for selectively initiating a second communication link (i.e., making an outgoing call) to an offline remote communication device (or computer). The operating instructions available to the control system are provided for controlling an activity of the Internet communication circuitry, especially in response to a request submitted from the remote communication device to selectively initiate the second communication link, i.e., to dial a phone number of the offline remote communication device Specifically, FIG. 6 shows that (i) remote computer 631 situated in Bloomfield (Mich.) has dialed into Internet communication system 601A through a telephone line 640A at a local call to establish a communication link 611A to ISP 600 and then to the Internet, i.e., becoming online, and (ii) in response to a request submitted from remote computer 631, ISP 600 instructs Internet communication system 601B through ISP backbone and the Internet to initiate a second communication link 611B through a phone line 640B that is normally open to reach an offline remote computer 632 situated in San Francisco (Calif.). Preferably, Internet communication system 601B is situated at a location with an area code corresponding to that of offline remote computer 632. Note that offline remote computer 632 may be an apparatus selected from the group consisting of server computers, desktop computers, portable computers, notebook computers, wireless phones, communication devices, and their combinations preferably each of which is a type of energy-conserving computer of the present invention, capable of being remotely waked up and dialed in through an internal or external modem, ISDN (integrated services digital network) adapter, DSL (digital subscriber line) modem, or cable modem for establishing communication therebetween. The result is that ISP 600 can now render an offline remote computer "online" at need for establishing communication in accordance with a request of the remote computer, for the first time. The immediate advantages are (i) to establish a bidirectional communication from Bloomfield (Mich.) to San Francisco (Calif.) at the rate of a local call or a reduced rate, and more importantly (ii) to leave the phone lines normally open for receiving an incoming call (either voice or data).

The operating instructions are adapted to allow the control system to instruct Internet communication circuitry to selectively initiate second communication link 611B in response to the request submitted from remote computer 631, so that remote computer 631 can initiate communication with offline remote computer 632 via the Internet. Further provided is a step of requesting Internet communication system 610A or 610B to send a ring signal to actuate offline remote computer 632 (i.e., an energy-conserving computer 300 of the present invention) from its keep-alive and offline state to an operating and online state so as to establish communication therebetween.

In case that remote computer 631 is a conventional one, the operating instructions will be adapted to comprise the steps of (i) determining if second communication link 611B can be established within a predetermined period of time (e.g., 5 seconds), and (ii) if not, requesting the Internet communication circuitry to send signals (including a ring and message) to actuate a telephone 635 (i.e., another remote communication device) for alerting a user selectively through audio or visual signals to manually actuate offline remote computer 632 from a power-off state to an operating state so as to establish communication therebetween.

Internet communication circuitry comprised in each of Internet communication units 601 is further adapted to be operable for establishing a plurality of the first communication links and for initiating a plurality of the second communication links. Each of the first communication links is directed to a respective one of the second communication links, so that a plurality of the remote computers can simultaneously utilize ISP 600 to dial out to reach a plurality of the offline computers. Internet communication units 601 each further comprises a communication-link medium selected from the group consisting of telephone lines 640, at least one cable 641, at least one optical fiber (shown as ISP backbone 605), at least one hybrid fiber coax 642, at least one radio frequency channel, at least one cellular phone channel via cell stations 650, at least one satellite communication channel via a satellite communications system (including a satellite 670 and earth stations 671A and 671B), at least one terrestrial microwave channel, at least one wireless communication channel, and their combinations for transmitting information, so that the communication system can be dialed in by a plurality of remote computers or communication devices and can dial out to reach the plurality of offline remote computers or communication devices through the communication-link means for establishing communications via the Internet. The frequency ranges of radio broadcasts (FM/TV), cellular, and satellites are respectively 54–806, 825–890, and 2,000–40,000 MHz. While communications satellites and terrestrial microwaves operate in the same microwave region of the electromagnetic spectrum, the microwaves of the latter travel in a line of sight between sending and receiving stations.

A user can preset offline remote computer 632 to route the information or message to another PC or a portable communication device such as a cellular phone (or car phone) 634 moved from a cell region 660A to a cell region 660B. Preferably, cellular phone 634 has a manual-operable button 635 designated for instantly requesting a data routing service.

Internet communication systems 610 each further comprises memory-storage means 602 serving as an POP (post office protocol) server for storing information to be provided from remote computer 631 to the offline remote computer 632, or vice verse. The operating instructions are adapted to allow remote computer 631 (or remote communication device) to send the information to memory-storage means 602 for storage and to request Internet communication systems 610 to send a message to offline remote computer 632 (or offline remote communication device) for instantly notifying the presence of the information. Consequently, a user will have a chance to preview the information before retrieving or to prevent virus being sent directly to offline remote computer 632.

The operating instructions are adapted to comprising the steps of (i) allowing remote computer 631 to send information to memory-storage means 602 for storage, (ii) if completed, requesting a selected one of communication units 601 to initiate second communication link 611B, and (iii) sending a message to offline remote computer 632 to instantly notify the presence of the information.

Further comprised in the operating instructions is a step of automatically terminating second communication link 611B selectively when remote computer 631 terminates the first or the second communication link (611A or 611B), when communication units 601 completes the sending of the message to offline remote computer 632, or detects no activity second communication link 611B for a preset period of time.

The discussion hereinabove also discloses a fifth primary preferred embodiment of the invention, providing a method to allow an ISP operable for establishing instant and direct communications between remote communication devices. The method comprises the steps of (a) providing an Internet communication system having a plurality of Internet communication circuitry connected to the Internet at separate locations, each of which being rendered accessible by at least one remote communication apparatus each for establishing a first communication link to the Internet; and (b) rendering the plurality of Internet communication circuitry each operable for dialing out to at least one offline communication apparatus each for establishing a second communication link in accordance with a request submitted from a respective one of the at least one remote communication apparatus, so that the at least one communication apparatus each can reach a respective one of the at least one offline communication apparatus through a respective one of the first communication links, the Internet, and a respective one of the second communication links. Further comprised are the steps of (i) instructing the Internet communication system to dial out for establishing the second communication link at the rate of a local call or a reduced rate, and (ii) providing a forwarding or routing service.

Figure 7:
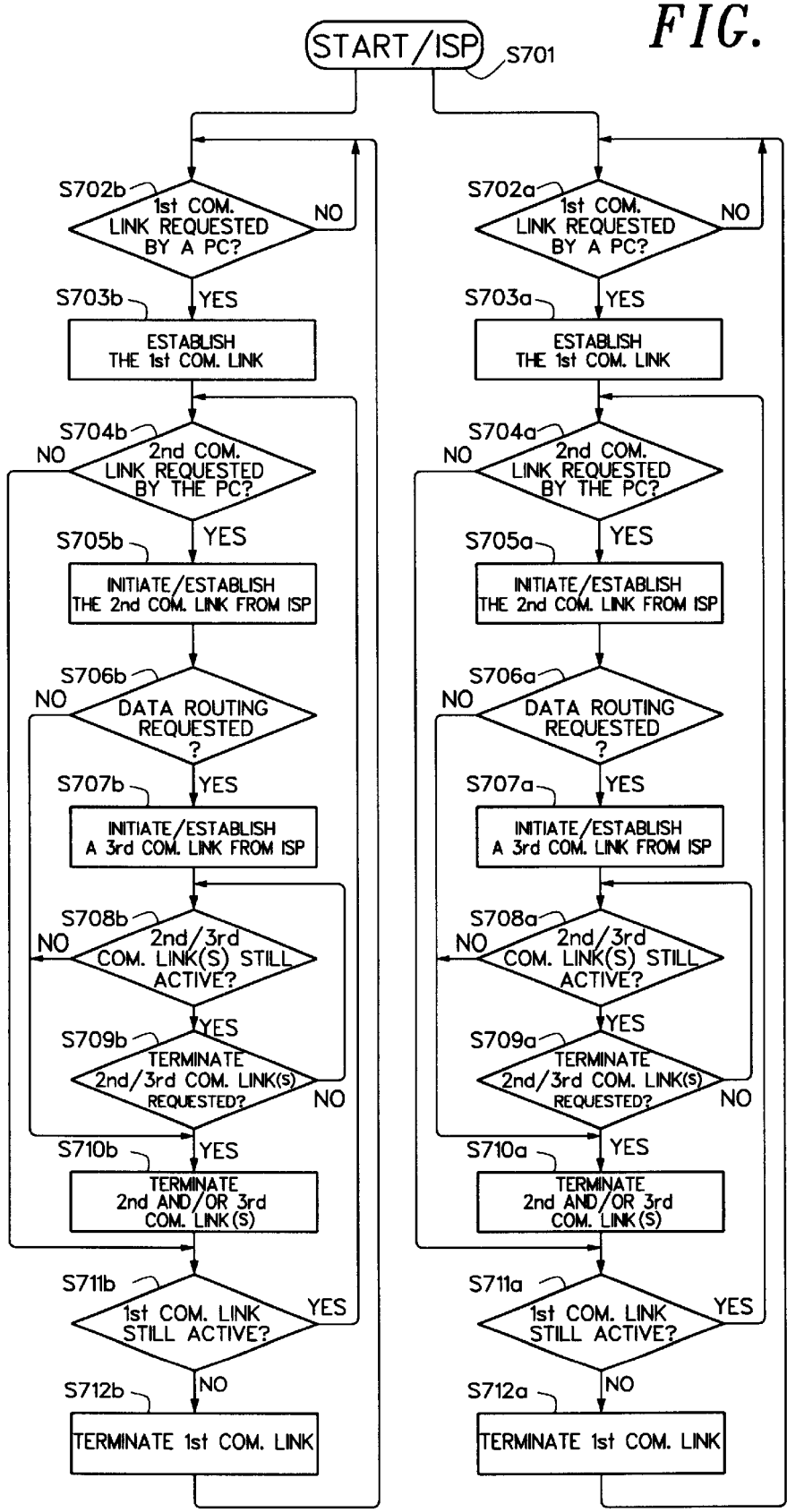
FIG. 7 is a flowchart of an ISP operating system used in conjunction with an ISP for allowing a plurality of remote communication apparatuses to access another plurality of offline remote communication apparatuses, in accordance with fifth and sixth primary preferred embodiments of the present invention.

Referring now to FIG. 7, a sixth primary preferred embodiment of the present invention is a communication operating system to be discussed as follows in conjunction with an Internet communication system (ICS) provided by an ISP as shown in FIG. 6. Comprised in the communication operating system are instructions made available to ISP 600 (S701) that allow a plurality of first communication links to be requested by remote PCs (or remote communication devices) and accordingly initiate at least a second plurality of second communication links from ISP 600 to offline remote PCs (or offline remote communication devices). To simplify the illustration, only two sets of operation (S702a–S712a and S702b–S712b) are displayed and only the former is discussed. S702a determines if a first communication link is requested by a PC. If yes, ICS allows the PC to establish the first communication link therefrom so as to access the Internet. In response to a request from the PC (S704a), ICS initiates a second communication link to an offline remote PC (S705a). When a data routing service is requested, ICS further initiates and establish a third communication link from ISP 600 to another offline PC (S706a and S707a). S708a and S709a respectively determine the activeness and the termination status of the second and/or the third communication link(s). If the second and/or the third communication link(s) be terminated (S710a), the activeness of the first communication link will be checked (S710a) and routed to S704a or terminated (S712a). Finally, the process is routed back to S702a for establishing another first communication link to be requested by another PC. Thus, the communication operating system renders the ICS operable for allowing a plurality of the remote PCs (or remote communication devices) to reach another plurality of the offline remote PCs (or offline remote communication devices). In other words, the communication operating system leaves the phone lines normally open while renders the "offline" remote PCs or communication devices reachable for establishing communication.

In summary, the sixth primary preferred embodiment of the present invention is to provide a communication operating system for use in an Internet communication system, comprising the steps of (a) allowing the Internet communication system to establish a plurality of incoming communication links each to be initiated by a remote communication apparatus to access the Internet; (b) determining if the remote communication apparatuses each submits a request for communicating further with an offline communication apparatus; and (c) if yes, instructing the Internet communication system to send an outgoing ring signal to a respective one of the offline communication apparatuses accordingly so as to establish another plurality of outgoing communication links. The communication operating system may further afford a forwarding or routing service.

Finally, it is clearly understood that such embodiments are provided by way of illustration and example only and are not to-be taken by way of limitation as numerous variations, changes, modification, and substitutions will occur to those skilled in the art without departing from the invention herein. Accordingly, it is intended that the invention be limited only by the spirit and scope of the appended claims.

What is claimed is:

1. An energy-conserving computer remotely reachable for establishing instant communications, comprising:

(a) a switchable power-supply system comprising switching means, for selectively providing switchable main power;

(b) a group of switchable circuit means in power connection with said switchable power-supply system, said group of switchable circuit means comprising main microprocessor circuitry, nonvolatile memory storage and a set of main operating instructions;

(c) a keep-alive power-supply system for providing keep-alive DC power;

(d) a group of keep-alive circuit means in power connection with said keep-alive power-supply system, said group of circuit means comprising a keep-alive communication circuit, keep-alive memory circuitry, and keep-alive control means; and (e) keep-alive operating instructions stored in said keep-alive memory circuitry;

whereby said keep-alive operating instructions are provided for allowing said keep-alive control means to request said keep-alive communication circuit to detect a communication signal in a keep-alive state in which said switchable power-supply system is deactivated for not supplying said switchable main power to the group of said switchable circuit means.

2. The energy-conserving computer of claim 1, wherein said keep-alive communication circuit is adapted to comprise circuitry means for performing conversion between digital and analog signals in said keep-alive state.

3. The energy-conserving computer of claim 1, wherein said keep-alive control means is adapted to comprise keep-alive microprocessor circuitry for controlling said keep-alive communication circuit and said keep-alive memory circuitry to respectively receive and store incoming information having a size smaller than a storage size available on said keep-alive memory circuitry, so as to render said energy-conserving computer reachable and operable for establishing instant communications in said keep-alive state.

4. The energy-conserving computer of claim 1, wherein said keep-alive operating instructions are provided for allowing said keep-alive control means to activate said switchable power-supply system to supply said switchable power selectively (i) if in response to detection of said communication signal, no communication link is able to be established within a predetermined period of time, (ii) if said nonvolatile memory storage needs to be accessed, or (iii) if a manual power-up signal is detected.

5. The energy-conserving computer of claim 1, wherein said group of switchable circuit means further comprises a switchable communication circuit rendered actuatable in response to said communication signal for establishing communication with a remote communication system.

6. The energy-conserving computer of claim 1, wherein said group of switchable circuit means further comprises volatile memory circuitry for storing information randomly accessible to said main microprocessor circuitry and wherein said keep-alive operating instructions comprise task information readily available to said keep-alive control means for restoring previous task activity from said nonvolatile memory storage to said volatile memory circuitry when said switchable power-supply system is activated.

7. The energy-conserving computer of claim 1, (a) wherein said group of switchable circuit means further comprises volatile memory circuitry for storing information randomly accessible to said main microprocessor circuitry and (b) wherein said switchable power-supply system is adapted to independently provide (i) a first power supply to said volatile memory circuitry and said main microprocessor circuitry and (ii) a second power supply to said nonvolatile memory storage, so as to allow said energy-conserving computer to direct information retrieval and storage only on said volatile memory circuitry for gaining full operating speed.

8. The energy-conserving computer of claim 1, (a) wherein said group of switchable circuit means further comprises volatile memory circuitry for storing information randomly accessible to said main microprocessor circuitry, (b) wherein said switchable power-supply system is adapted to receive AC power from an external AC-power source and to independently provide (i) a first switchable power supply to said volatile memory circuitry and said main microprocessor circuitry and (ii) a second switchable power supply to said nonvolatile memory storage, and (c) wherein said keep-alive power-supply system comprises a battery power source arranged to provide backup DC power to said switchable power-supply system when said AC power is suddenly absent, so as to allow said energy-conserving computer to safely direct information retrieval and storage only on said volatile memory circuitry for gaining full operating speed.

9. The energy-conserving computer of claim 1, wherein said group of switchable circuit means further comprises means actuatable for dissipating heat.

10. The energy-conserving computer of claim 1, wherein said group of switchable circuit means further comprises cooling means for selectively dissipating heat, and wherein said switching means is adapted to comprise a relay rendered temperature-sensitive for supplying a switchable power supply from said switchable power-supply system to said cooling means only when the temperature inside said energy-conserving computer exceeds a preset value.

11. The energy-conserving computer of claim 1, wherein said switchable power is selected from the group consisting of AC power, regulated DC power, DC power, and their combinations.

12. The energy-conserving computer of claim 1, wherein said keep-alive power-supply system comprises means for providing said keep-alive DC power from a power source selected from the group consisting of a signal-transmitting medium carrying keep-alive power, an external AC-power source, battery, rechargeable battery, fuel-cell means, and their combinations.

13. The energy-conserving computer of claim 1, wherein said switchable power-supply system and said keep-alive power-supply system further comprise separate power sources each selected from the group consisting of an external AC-power source, battery, rechargeable battery, fuel-cell means, and their combinations for respectively providing said switchable power and said keep-alive DC power.

14. An energy-conserving communication apparatus remotely reachable for establishing instant communications, comprising:
(a) a switchable power-supply system comprising switching means, for selectively providing switchable power to a main circuit means utilizing a set of main operating instructions;
(b) a keep-alive power-supply system connectable with a signal-transmitting medium that carries a keep-alive power source, for providing keep-alive power from said keep-alive power source to a keep-alive circuit means utilizing a set of keep-alive operating instructions; and
(c) said keep-alive circuit means in power connection with said keep-alive power-supply system, comprising (i) a keep-alive communication circuit coupled to said signal-transmitting medium, and (ii) keep-alive control means for controlling an activity of said switching means, so as to enter a keep-alive state in which said switchable power-supply system is deactivated while said keep-alive communication circuit remains operable for detecting a communication signal initiated from a remote communication system.

15. The energy-conserving communication apparatus of claim 14, wherein said signal-transmitting medium is selected from the group consisting of at least one cable, coaxial cable, optical fiber, hybrid fiber coaxial cable, CATV cable, and their combinations each being utilized for carrying a respective keep-alive power source and communication signal.

16. The energy-conserving communication apparatus of claim 14, wherein said keep-alive power-supply system comprises an additional power source selected from the group consisting of battery, rechargeable battery, and their combinations for supplying backup DC power.

17. The energy-conserving communication apparatus of claim 14, wherein said switchable power is selected from the group consisting of AC power, regulated DC power, DC power, and their combinations.

18. The energy-conserving communication apparatus of claim 14, wherein said switchable power-supply system further comprises means for providing said switchable power from a power source selected from the group consisting of an external AC-power source, battery, rechargeable battery, fuel-cell means, and their combinations.

19. The energy-conserving communication apparatus of claim 14 further comprising a group of switchable circuit means in power connection with said switchable power-supply system, wherein said group of switchable circuit means comprises main microprocessor circuitry and nonvolatile memory storage operable when said switchable power-supply system is activated for providing said switchable power.

20. The energy-conserving communication apparatus of claim 14 further comprising a group of switchable circuit means in power connection with said switchable power-supply system, wherein said group of switchable circuit means comprises means actuatable in response to said communication signal for printing incoming information.

21. The energy-conserving communication apparatus of claim 14 further comprising a group of switchable circuit means in power connection with said switchable power-supply system, wherein said group of switchable circuit means comprises means actuatable for dissipating heat.

22. The energy-conserving communication apparatus of claim 14 further comprising a group of switchable circuit means in power connection with said switchable power-supply system, wherein said group of switchable circuit means comprises cooling means for selectively dissipating heat, and wherein said switching means is adapted to comprise a relay rendered temperature-sensitive for supplying a switchable power supply from said switchable power-supply system to said cooling means only when the temperature inside said energy-conserving communication apparatus exceeds a preset value.

23. The energy-conserving communication apparatus of claim 14 further comprising a group of switchable circuit means in power connection with said switchable power-supply system, wherein said group of switchable circuit means comprises a switchable communication circuit coupled to said signal-transmitting medium and rendered actuatable for establishing communication in response to detection of said communication signal.

24. The energy-conserving communication apparatus of claim 14 further comprising a group of switchable circuit means in power connection with said switchable power-supply system, wherein said group of switchable circuit means comprises a switchable communication circuit coupled to said signal-transmitting medium, and wherein said group of keep-alive circuit means further comprises (i) keep-alive memory circuitry and (ii) keep-alive operating instructions stored in said keep-alive memory circuitry for allowing said keep-alive control means to request said keep-alive communication circuit to detect said communication signal in a keep-alive state and to actuate said switchable communication circuit for establishing communication in detection of said communication signal.

25. An energy-conserving operating system comprising the steps of:
  (a) activating a set of keep-alive operating instructions for providing an energy-conserving operation that utilizes keep-alive microprocessor circuitry;
  (b) powering up to provide a main operation that utilizes main microprocessor circuitry and a set of main operating instructions, if detecting a power-up signal; and
  (c) powering down to provide said energy-conserving operation in which said main microprocessor circuitry is deactivated, if detecting a power-down signal;
    wherein said keep-alive operating instructions provide said energy-conserving operation requiring less computation power as compared with said main operating instructions.

26. The energy-conserving operating system of claim 25, wherein said set of keep-alive operating instructions is adapted to comprise a communication program operable in said energy-conserving operation for requesting a keep-alive communication circuit to be activated for detecting a ring signal.

27. The energy-conserving operating system of claim 25, wherein said set of main operating instructions is adapted to comprise a communication program operable in said main operation for requesting a communication circuit to be activated for detecting a ring signal.

28. The energy-conserving operating system of claim 25, wherein said activating is adapted to load said set of keep-alive instructions to keep-alive random-access-memory circuitry and wherein said powering up is adapted to restore said main operating instructions from nonvolatile memory storage to main random-access-memory circuitry.

29. The energy-conserving operating system of claim 25, wherein said activating is r adapted to load said set of keep-alive instructions to a predetermined region of keep-alive random-access-memory modules that can be continuously kept alive, and wherein said powering up is adapted to restore said main operating instructions from nonvolatile memory storage to another predetermined region of random-access-memory modules that can be powered selectively up or down.

30. The energy-conserving operating system of claim 25, wherein said set of keep-alive operating instructions is adapted to create keep-alive task information for restoring previous task activity when said powering up is executed, said keep-alive task information being created, updated, and saved to keep-alive random-access-memory circuitry before said powering down is executed.

31. The energy-conserving operating system of claim 25, wherein said set of keep-alive operating instructions is adapted to create keep-alive task information for restoring previous task activity when said powering up is executed, said keep-alive task information being created, updated, and saved to keep-alive random-access-memory circuitry and nonvolatile memory storage before said powering down is executed.

32. The energy-conserving operating system of claim 25, wherein said activating is adapted to load said set of keep-alive instructions to keep-alive random-access-memory circuitry and wherein said powering up is adapted to enter (i) a first operating state in which said set of main operating instructions will be restored via actuating nonvolatile memory storage for retrieving information therefrom to main random-access-memory circuitry, (ii) a second operating state in which information retrieval and storage will be limited to only said main random-access-memory circuitry, so as to execute said main operating instructions at full operating speed, and (iii) a third operating state in which any newly modified files will be stored from said main random-access-memory circuitry to said nonvolatile memory storage in detection of said power-down signal.

33. The energy-conserving operating system of claim 25, wherein said powering down and said powering up are adapted respectively to deactivate and to activate a switchable power-supply system for not providing and for providing power to a plurality of circuit means including said main microprocessor circuitry and nonvolatile memory utilized for providing said main operation, so as to provide said energy-conserving operation and said main operation, respectively.

34. The energy-conserving operating system of claim 25, wherein said powering down is adapted to be executed after any newly modified files are stored to nonvolatile memory storage.

35. The energy-conserving operating system of claim 25 further comprising a step of allocating part of keep-alive random-access-memory circuitry for storing incoming information to be received in said energy-conserving operation.

36. The energy-conserving operating system of claim 25 further comprising a step of powering up to a communication state in which a switchable power-supply system is activated to provide a switchable power supply only to a switchable communication circuit and nonvolatile memory storage for respectively receiving and storing incoming information to be received, if only a ring signal is detected.

37. The energy-conserving operating system of claim 25 further comprising the steps of (i) allowing a user to request a forwarding or routing service, and (ii) if said forward or routing service is requested, initiating another communication link to another remote communication apparatus accordingly.

* * * * *